(12) United States Patent
Xu et al.

(10) Patent No.: US 10,493,433 B2
(45) Date of Patent: Dec. 3, 2019

(54) SYNTHESIS OF COLLOIDAL PRECIOUS METALS NANOPARTICLES WITH CONTROLLED SIZE AND MORPHOLOGY

(71) Applicant: BASF CORPORATION, Florham Park, NJ (US)

(72) Inventors: Xiaoming Xu, Edison, NJ (US); Xinsheng Liu, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 46 days.

(21) Appl. No.: 15/511,271

(22) PCT Filed: Oct. 7, 2015

(86) PCT No.: PCT/US2015/054525
§ 371 (c)(1),
(2) Date: Mar. 15, 2017

(87) PCT Pub. No.: WO2016/057692
PCT Pub. Date: Apr. 14, 2016

(65) Prior Publication Data
US 2017/0304805 A1      Oct. 26, 2017

Related U.S. Application Data

(60) Provisional application No. 62/061,082, filed on Oct. 7, 2014.

(51) Int. Cl.
*B01J 23/46* (2006.01)
*B01J 37/04* (2006.01)
(Continued)

(52) U.S. Cl.
CPC ......... *B01J 23/464* (2013.01); *B01F 17/0007* (2013.01); *B01J 21/04* (2013.01);
(Continued)

(58) Field of Classification Search
CPC ... B01J 23/40; B01J 23/42; B01J 23/44; B01J 23/46; B01J 23/462; B01J 23/48; B01J 35/0013; B01J 35/04; B01J 37/16
See application file for complete search history.

(56) References Cited

U.S. PATENT DOCUMENTS 5,977,012 A    11/1999  Kharas et al.
6,197,720 B1   3/2001   Heineke et al.
(Continued)

FOREIGN PATENT DOCUMENTS

WO    2013-133315 A1   9/2013
WO    WO 2013/186740   12/2013
WO    WO 2017/118932   7/2017

OTHER PUBLICATIONS

European Search Report for EP Patent Application No. 15849640.6, dated Jun. 26, 2018, 4 pages.
(Continued)

*Primary Examiner* — Jun Li
(74) *Attorney, Agent, or Firm* — Womble Bond Dickinson (US) LLP (57) ABSTRACT

The present invention relates to colloidal dispersions comprising a plurality of precious group nanoparticles, wherein about 90% or more of the precious group metal is in fully reduced form; a dispersion medium comprising a polar solvent; a water-soluble polymer suspension stabilizing agent; and a reducing agent, wherein the nanoparticle concentration is at least about 2 wt. % of the colloidal dispersion, wherein the nanoparticles have an average particle size of about 1 to about 6 nm and at least 95% of the nanoparticles have a particle size within this range; and further wherein the colloidal dispersion is substantially free of halides, alkali metals, alkaline earth metals and sulfur com-
(Continued)

pounds. Methods of preparing, further processing, and using such colloidal dispersions are also provided herein.

23 Claims, 7 Drawing Sheets (51) Int. Cl.
  *B01J 23/42*  (2006.01)
  *B01J 23/44*  (2006.01)
  *B01J 37/16*  (2006.01)
  *B01J 21/04*  (2006.01)
  *B01F 17/00*  (2006.01)
  *B01J 23/40*  (2006.01)
  *B01J 23/48*  (2006.01)
  *B01J 35/00*  (2006.01)
  *B01J 35/02*  (2006.01)
  *B01J 37/02*  (2006.01)
  *B01J 37/00*  (2006.01)

(52) U.S. Cl.
  CPC ............... *B01J 23/40* (2013.01); *B01J 23/42* (2013.01); *B01J 23/44* (2013.01); *B01J 23/48* (2013.01); *B01J 35/0006* (2013.01); *B01J 35/0013* (2013.01); *B01J 35/023* (2013.01); *B01J 37/0072* (2013.01); *B01J 37/0215* (2013.01); *B01J 37/04* (2013.01); *B01J 37/16* (2013.01)

(56) References Cited

U.S. PATENT DOCUMENTS

| | | | |
|---|---|---|---|
| 6,440,378 B1 | 8/2002 | Hirata et al. | |
| 2003/0187294 A1 | 10/2003 | Hgemeyer et al. | |
| 2007/0034052 A1* | 2/2007 | Vanheusden | B22F 1/0018 |
| | | | 75/362 |
| 2007/0135299 A1 | 6/2007 | Lee et al. | |
| 2008/0264205 A1 | 10/2008 | Zeng et al. | |
| 2008/0277630 A1* | 11/2008 | Kiyoshima | A61K 8/02 |
| | | | 252/514 |
| 2009/0256118 A1* | 10/2009 | Tanaka | B01J 13/0043 |
| | | | 252/514 |
| 2010/0101637 A1* | 4/2010 | Yamasaki | B22F 1/0022 |
| | | | 136/252 |
| 2011/0207019 A1* | 8/2011 | Mukerjee | H01M 4/921 |
| | | | 429/487 |
| 2013/0221288 A1* | 8/2013 | Liu | H01B 1/02 |
| | | | 252/514 |
| 2013/0303813 A1* | 11/2013 | Cabiac | B01J 23/66 |
| | | | 585/277 |
| 2014/0141966 A1 | 5/2014 | Watanabe et al. | |
| 2015/0057147 A1 | 2/2015 | Sakurai et al. | |
| 2015/0236354 A1* | 8/2015 | Binder | B01J 13/0043 |
| | | | 502/1 |

OTHER PUBLICATIONS

International Search Report dated Dec. 21, 2015.
Written opinion dated Dec. 21, 2015.

* cited by examiner

SYNTHESIS OF COLLOIDAL PRECIOUS METALS NANOPARTICLES WITH CONTROLLED SIZE AND MORPHOLOGY

This is a National Phase Application filed under 35 U.S.C. 371 of International Application No. PCT/US2015/054525 filed Oct. 7, 2015, claiming the benefit under 35 USC 119(e) of U.S. Provisional Application No. 62/061,082, filed Oct. 7, 2014, the entire contents of each hereby incorporated by reference.

FIELD OF THE INVENTION

The present invention relates to halide, alkali and alkaline earth metals, and sulfur free colloidal precious metal nanoparticles with high precious metal concentration for catalyst applications and methods for their synthesis.

BACKGROUND OF THE INVENTION

Precious group metal nanoparticles (PGMNPs) have attracted great interest due to their unique catalytic, electronic, and optical properties. For example, platinum-based catalysts (including platinum nanoparticles, PtNPs) are widely used in automobile emission control, chemical industry processes, in the petroleum industry and in low-temperature fuel cells. See U. A. Paulus, T. J. Schmidt, H. A. Gasteiger, R. J. Behm, *J. Electroanal. Chem.*, 134, 495 (2001); J. W. Yoo, D. J. Hathcock, M. A. El-Sayed, *J. Catalysis*, 214, 1-7 (2003) and P. K. Jain, X. Huaung, M. A. Ei-Sayed, *Acc. Chem. Res.*, 41, 1578-1586 (2008). Syntheses of Pt nanoparticles (PtNPs) with controlled size and shape provide great opportunities for developing high-performance industrial Pt catalysts. See M. Q. Zhao, R. M. Crooks, *Adv. Mater.*, 11, 217-220 (1999); M. Oishi, N. Miyagawa, T. Sakura, Y. Nagasaki, *React. Fund. Polym.* 67, 662-668 (2007) and K. Peng, X. Wang, X. Wu, S. Lee, *Nano Lett.*, 9, 3704-3709 (2009).

A number of methods have been developed to synthesize PGMNPs, which include spray pyrolysis, vapor deposition, high-temperature reduction-fusion and wet chemistry synthesis. See X. Xue, C. Liu, W. Xing, T, Lu, *J. Electrochem., Soc.*, 153, E79-84, 2006; P. Sivakumar, I. Randa, T. Vincenzo, *Electrochim. Acta*, 50, 3312-3319, 2005; D. W. Mckee, *Nature*, 192, 654, 1961; and A. Siani, K. R. Wigal, O. S. Alexeev, and M. D. Amiridis, *J. Catalysis*, 257, 5-15, 2008. The wet chemistry synthesis method for the preparation of PGMNPs has attracted significant attention due to its technical simplicity and low cost. Also, the wet chemistry synthesis method can provide opportunities to manipulate: (1) precious group metal (PGM) nanoparticle size and size distribution; (2) nanoparticle morphology; and (3) PGM-based alloy composition and structure by simply controlling reaction ingredients and synthesis conditions.

In a typical wet chemistry synthesis, colloidal PGMNPs are synthesized by reduction of a PGM precursor with a reducing agent in a stabilizer-containing solution. In the past, many efforts have been made to synthesize such colloidal PGMNPs for catalyst applications. See M. Adlim, M. A. Bakar, K. Y. Liew, and J. Ismail, *J. Molecular Catalysis A*, 212, 141-149, 2004; P. R. Rheenen, M. J. Mckelvy, and W. S. Glaunsinger, *J. Solid State Chemistry*, 67, 151-169, 1987; and O. V. Cherstiouk, P. A. Simonov, E. R. Savinova, *Electrochim. Acta*, 48, 3851-3860, 2003. However, the existing synthesis methods for the preparation of colloidal PGMNPs do not meet the requirements for certain catalyst applications. First, the reported syntheses in the literature are usually done with very dilute PGM solutions (~$10^{-4}$ M). Thus the concentration of the resulting PGM nanoparticles is too low to be practical for most catalyst preparations. Second, the reported synthesis methods commonly employ halogen-containing PGM precursors and sodium-containing inorganic reductants. As a result, undesired $Na^+$ and halide (e.g., $Cl^-$) ions remain on the catalyst surface after synthesis. Such ions can poison and negatively impact the performance of catalysts prepared in this manner and post-synthesis washing processes are thus needed to completely remove these ions. Third, the reported syntheses mostly use hazardous organic solvents and/or toxic organic reductant species. Further, it may be difficult to obtain nanoparticles having the desired size. For example, only syntheses for 1-3 nm PtNPs have been reported in the literature. In addition, some syntheses are reported to require special apparatus and to be run under harsh and/or difficult-to-control conditions.

Therefore, an environmentally-friendly and size-controlled synthesis of halogen- and sodium-free colloidal PGMNPs with high metal content would be useful.

SUMMARY OF THE INVENTION

In one aspect, the present disclosure provides a colloidal dispersion comprising nanoparticles of one or more precious group metals (PGMs) and a dispersion medium comprising at least one polar solvent. Such colloidal dispersions can advantageously comprise other components, e.g., at least one water-soluble polymer suspension stabilizing agent and at least one organic reducing agent. Such colloidal dispersions beneficially can be substantially free of halides, alkali metals, alkaline earth metals and sulfur compounds and can exhibit high stability.

In one aspect, the disclosure provides a colloidal dispersion comprising: a) a plurality of precious group metal nanoparticles selected from the group consisting of Pt, Pd, Au, Ag, Ru, Rh, Ir, Os, alloys thereof, and mixtures thereof, wherein about 90% or more of the precious group metal is in fully reduced form; b) a dispersion medium comprising a polar solvent; c) a water-soluble polymer suspension stabilizing agent; and d) a reducing agent, wherein the nanoparticle concentration is at least about 2 wt. % of the total weight of the colloidal dispersion, wherein the nanoparticles have an average particle size of about 1 to about 8 nm and at least 95% of the nanoparticles have a particle size within this range, and further wherein the colloidal dispersion is substantially free of halides, alkali metals, alkaline earth metals and sulfur compounds.

The composition of the components of the colloidal dispersions disclosed herein can vary. For example, in certain embodiments, the precious group metal nanoparticles are selected from the group consisting of Pt, Pd, alloys thereof, and combination thereof. The water soluble polymer suspension stabilizing agent can, in various embodiments, be selected from the group consisting of polyvinylpyrrolidone, a copolymer comprising vinylpyrrolidone, a fatty acid-substituted or unsubstituted polyoxyethylene, and combinations thereof. In certain embodiments, the water soluble polymer suspension stabilizing agent is polyvinylpyrrolidone. The reducing agent can, in some embodiments, be selected from the group consisting of hydrogen, hydrazine, hydroxyethylhydrazine, formic hydrazide, urea, formaldehyde, formic acid, ascorbic acid, citric acid, glucose, sucrose, xylitol, meso-erythritol, sorbitol, glycerol, maltitol, oxalic acid, methanol, ethanol, 1-propanol, iso-propanol, 1-butanol, 2-butanol, 2-methyl-propan-1-ol, allyl alcohol, diacetone alcohol, ethylene glycol, propylene glycol, diethylene glycol, tetraethylene glycol, dipropylene glycol, tannic acid, garlic acid, and combinations thereof. In certain embodiments, the reducing agent is selected from the group consisting of ascorbic acid, glucose, tetraethylene glycol, ethanol, ethylene glycol, meso-erythritol, xylitol, sorbitol, glycerol, sucrose, maltitol, and combinations thereof. For example, in certain embodiments, the reducing agent is ascorbic acid. In some embodiments, the polar solvent can be selected from the group consisting of water, alcohols, dimethylformamide, and combinations thereof, such as solvents selected from the group consisting of water, methanol, ethanol, 1-propanol, 2-propanol, 1-butanol, 2-butanolisobutanol, hexanol, octanol, glycerol, glycol, ethylene glycol, diethylene glycol, triethylene glycol, butanediol, tetraethylene glycol, propylene glycol, polyethylene glycol, polypropyleneglycol, 1,2-pentadiol, 1,2-hexadiol, and combinations thereof. In certain embodiments, the polar solvent is water.

The nanoparticles of the colloidal dispersions can have various average particle sizes and various particle size ranges. In certain embodiments, the nanoparticles are substantially monodisperse. The colloidal dispersions may, in some embodiments, comprise nanoparticles having an average particle size of about 1 to about 5 nm, wherein at least 95% of the nanoparticles have a particle size within this range. The colloidal dispersions may, in some embodiments, comprise nanoparticles having an average particle size of about 1 to about 4 nm, wherein at least 95% of the nanoparticles have a particle size within this range. The colloidal dispersions may, in some embodiments, comprise nanoparticles having an average particle size of about 1 to about 3 nm, wherein at least 95% of the nanoparticles have a particle size within this range. The colloidal dispersions may, in some embodiments, comprise nanoparticles having an average particle size of about 3 to about 6 nm, wherein at least 95% of the nanoparticles have a particle size within this range. In some embodiments, at least 95% of the nanoparticles have a particle size of within 50 percent of the average particle size. The nanoparticle concentration within the colloidal dispersions disclosed herein can be, for example, about 2 wt. % to about 80 wt. % of the total weight of the colloidal dispersion or about 2 wt. % to about 10 wt. % of the total weight of the colloidal dispersion.

Advantageously, in preferred embodiments, the dispersions disclosed herein are considered to be highly stable. For example, such dispersions can, in some embodiments, be shelf-stable for at least about 6 months or at least about 12 months at ambient temperature. The stability of the dispersions can, in some embodiments, be evaluated by observing the dispersion after centrifuging, based on known correlations. For example, various colloidal dispersions disclosed herein exhibit no nanoparticle separation from the colloidal dispersion when the dispersion is centrifuged at 4,000 rpm for 10 minutes at ambient temperature (corresponding to a shelf stability of at least 6 months).

In another aspect, the disclosure provides a method of making a precious group metal nanoparticle colloidal dispersion wherein about 90% or more of the precious group metal is in fully reduced form, comprising: a) preparing a solution of precious group metal precursors selected from salts of Pt, Pd, Au, Ag, Ru, Rh, Ir, Os and alloys thereof in the presence of a dispersion medium and a water soluble polymer suspension stabilizing agent, wherein the precious group metal precursors are substantially free of halides, alkali metals, alkaline earth metals and sulfur compounds; and b) combining the solution with a reducing agent to provide a precious group metal nanoparticle colloidal dispersion wherein the nanoparticle concentration is at least about 2 wt. % of the total weight of the colloidal dispersion and wherein at least about 90% of the precious group metal in the colloidal dispersion is in fully reduced form.

Exemplary precious group metal precursors include, but are not limited to, alkanolamine salts, hydroxy salts, nitrates, carboxylic acid salts, ammonium salts, and oxides. In certain embodiments, the precious group metal precursor is selected from the group consisting of monoethanolamine Pt(IV) hexahydroxide, dihydrogen hexahydroxyplatinate, Pd(OH)$_2$, Ir(OH)$_4$, Rh nitrate, Pt nitrate, Pt citrate, Pd(II) nitrate, Pd(II) citrate, and Pd (II) ammonia hydroxide complex. One preferred precious group metal precursor useful in certain embodiments is monoethanolamine Pt(IV) hexahydroxide.

The conditions of the disclosed methods can vary and, in some embodiments, the method is conducted at room temperature. In some embodiments, one or more steps of the method is conducted at elevated temperature. For example, in certain embodiments, the mixture of solution and reducing agent prepared in the combining step can be heated. In certain embodiments, the nanoparticle colloidal dispersion can be heated. In such embodiments, the temperature to which the mixture or dispersion is heated can be, e.g., at least about ambient temperature, or at least about 55° C., including temperatures of about ambient temperature to about 200° C., e.g., about 55° C. to about 200° C. In some embodiments, the heating can be at a temperature of at least about 100° C., such as about 100° C. to 200° C. The optional heating can, in some embodiments, comprise hydrothermal processing.

One particular embodiment provides a method for preparing a platinum nanoparticle dispersion, wherein step a) of the method comprises: preparing a solution of platinum precursor in a dispersion medium, in the presence of a water soluble polymer suspension stabilizing agent, wherein the solution is substantially free of halides, alkali metals, alkaline earth metals and sulfur compounds; and step b) of the method comprises combining the solution with ethylene glycol as a reducing agent to provide a platinum nanoparticle colloidal dispersion, wherein the platinum nanoparticle concentration is at least about 2 wt. % of the colloidal dispersion and wherein at least about 90% of the platinum in the colloidal dispersion is in fully reduced form, and wherein the platinum nanoparticles have an average particle size of about 1 to about 6 nm, wherein at least 95% of the nanoparticles have a particle size within this range. In certain such embodiments, the platinum nanoparticles can have an average particle size of about 5 nm. In certain such embodiments, at least 95% of the platinum nanoparticles have a particle size of within 50 percent of the average particle size.

In certain embodiments, the method can further comprise applying any of the disclosed nanoparticle dispersions to a solid support material. Accordingly, another aspect of the disclosure provides a catalyst comprising: a solid support material; and precious metal group nanoparticles associated with the support material, wherein the nanoparticles are generally prepared according to the methods disclosed herein. Exemplary solid support materials can include, but are not limited to, materials selected from the group consisting of silica, alumina, silica/alumina, titania, zirconia, CeO$_2$, rare earth oxides, zeolites, carbon, clay materials and combinations thereof. Catalysts disclosed herein can, in some embodiments, be in the form of catalysts for the purification of an exhaust gas of a combustion engine.

DETAILED DESCRIPTION OF THE PREFERRED EMBODIMENTS

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article. By way of example, "a reducing agent" means one reducing agent or more than one reducing agent. Any ranges cited herein are inclusive. The term "about" used throughout this specification are used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0. All measurements herein are performed at ambient conditions, 25° C. and 1 atm of pressure, unless otherwise indicated.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Colloidal Dispersions

As disclosed above, colloidal dispersions provided herein can comprise: a) a plurality of one or more precious group metal nanoparticles (PGMNPs), b) a dispersion medium, c) a stabilizing agent, and d) reducing agent. These components will be detailed herein below.

The PGMNPs in the colloidal dispersions comprise nanoparticles of precious group metals (PGMs). PGM as used herein means a metal selected from the group consisting of platinum (Pt), palladium (Pd), gold (Au), silver (Ag), ruthenium (Ru), rhodium (Rh), iridium (Ir), osmium (Os), and combinations and alloys thereof. Advantageously, the PGM in such colloidal dispersions is substantially in fully reduced form, meaning that at least about 90% of the precious metal content is reduced to the metallic form (PGM(0)). In some embodiments, the amount of PGM in fully reduced form is even higher, e.g., at least about 92%, at least about 94%, at least about 95%, at least about 96%, at least about 97%, at least about 98%, or at least about 99% of the PGM is in fully reduced form. The amount of PGM(0) can be determined using ultrafiltration, followed by Inductively Coupled Plasma/Optical Emission Spectrometry (ICP-OES). In this method, the unreduced PGM species in the colloidal dispersion can be separated from the PGM(0) nanoparticles, and then the PGNMPs can be quantified by ICP-OES.

The PGMNP concentration within the colloidal dispersions disclosed herein can be higher than that within known colloidal dispersions. In some embodiments, the PGMNP concentration is about 2 wt. % or more of the colloidal dispersion. For example, the PGMNP concentration can be from about 2 wt. % to about 80 wt. % of the colloidal dispersion, about 2 wt. % to about 20 wt. % of the colloidal dispersion, about 2 wt. % to about 10 wt. % of the colloidal dispersion, or 2 wt. % to about 5 wt. % of the colloidal dispersion. PGMNP concentrations can be measured using ICP-OES.

The average size of the PGMNPs in the colloidal dispersion can vary. In some embodiments, the PGMNPs in a given colloidal dispersion can have average particle sizes of about 1 nm to about 10 nm, e.g., about 1 nm to about 6 nm, such as an average particle size of about 1 nm, about 2 nm, about 3 nm, about 4 nm, or about 5 nm. Certain embodiments can have average particle sizes of about 1-2 nm, about 1-3 nm, about 1-4 nm, about 1-5 nm, about 1-6 nm, about 2-3 nm, about 2-4 nm, about 2-5 nm, about 2-6 nm, about 3-4, about 3-5 nm, about 3-6 nm, about 4-5 nm, about 4-6 nm, or about 5-6 nm.

Advantageously, the PGMNPs in the colloidal dispersions disclosed herein are substantially monodisperse. In certain embodiments, the particles can be viewed as monodisperse, meaning the PGMNP population is highly uniform in particle size. Certain monodisperse particle populations useful in the present invention can be characterized as consisting of particles wherein at least 95% of the particles have a particle size within 50 percent of the average particle size for the particle population, or within 20 percent, or within 15 percent, or within 10 percent (i.e., wherein at least 95% of all particles in the population have a particle size within the given percentage range around the average particle size). In other embodiments, at least 96%, 97%, 98%, or 99% of all particles fall within these ranges. In one exemplary embodiment, the average particle size is about 2 nm and at least 95% of all particles (or at least 96%, 97%, 98%, 99%, or 100%) of all particles in the population have a particle size in the range of about 1 nm to about 3 nm (i.e., within about 50 percent of the average particle size). Specific PGMNP dispersions can comprise substantially monodisperse dispersions, with average PGMNP particle sizes of about 2 nm, about 3 nm, about 4 nm, and about 5 nm.

Particle sizes and size distribution of PGMNPs can be determined using Transmission Electron Microscopy (TEM). Such values can be found by visually examining a TEM image, measuring the diameter of the particles in the image, and calculating the average particle size of the measured particles based on magnification of the TEM image. The particle size of a particle refers to the smallest diameter sphere that will completely enclose the particle, and this measurement relates to an individual particle as opposed to an agglomeration of two or more particles. The above-noted size ranges are average values for particles having a distribution of sizes.

The dispersion medium may be, but is not limited to, at least one polar solvent selected from the group consisting of water, alcohols (including polyols), dimethylformamide (DMF), and combinations thereof. The alcohol may, in some embodiments, be selected from the group consisting of methanol, ethanol, 1-propanol, 2-propanol, 1-butanol, 2-butanolisobutanol, hexanol, octanol, and combinations thereof. The polyol may, in some embodiments, be selected from the group consisting of glycerol, glycol, ethylene glycol, diethylene glycol, triethylene glycol, butanediol, tetraethylene glycol, propylene glycol, polyethylene glycol, polypropyleneglycol, 1,2-pentadiol, 1,2-hexadiol, and combinations thereof. In one embodiment, the dispersion medium comprises water; accordingly, certain dispersions as disclosed herein can be described as aqueous colloidal dispersions.

The stabilizing agent is typically a water-soluble polymer suspension stabilizing agent, used to improve dispersion of the PGM nanoparticles. The composition and the size (e.g., weight average-molecular weight, $M_w$) of the water-soluble polymer can vary. In some embodiments, the polymer has a $M_w$ of 2,000 to 2,000,000 Da, and preferably has a $M_w$ of 10,000 to 60,000 Da (measured using Gel Permeation Chromatography (GPC). Suitable water-soluble polymers include, but are not limited to, polyvinyl pyrrolidone (PVP), a copolymer including vinyl pyrrolidone as a first polymerization unit, and a fatty acid-substituted or unsubstituted polyoxyethylene. Polyvinyl pyrrolidone is particularly useful as the water soluble polymer suspension stabilizing agent.

Where a copolymer including vinyl pyrrolidone as a first polymerization unit is used as a stabilizing agent, the copolymer may further include, e.g., an acrylic acid, styrene, vinyl acetate, or vinyl alcohol as a second polymerization unit. Such copolymers can comprise first and second polymerization units in a weight ratio of 1:99 to 99:1, and preferably, 20:80 to 80:20. Certain exemplary copolymers include (1-vinyl pyrrolidone)-acrylic acid copolymer and (1-vinyl pyrrolidone)-vinyl acetic acid copolymer. In certain embodiments, where a (1-vinyl pyrrolidone)-acrylic acid copolymer is used, the 1-vinyl pyrrolidone repeating unit and the acrylic acid repeating unit are in a weight ratio of about 99:1 to about 50:50 or about 60:40 to about 80:20 (e.g., 75:25). In certain embodiments, where a (1-vinyl pyrrolidone)-vinyl acetic acid copolymer is used, the 1-vinyl pyrrolidone repeating unit and the vinyl acetic acid repeating unit are in a weight ratio of about 99:1 to 50:50 or about 50:50 to about 70:30 (e.g., 57:43). Where a fatty acid-substituted polyoxyethylene is used as the stabilizing agent, the fatty acid can be selected from palmitic acid, oleic acid, linoleic acid, or stearic acid, with stearic acid being more preferred.

The water-soluble polymer suspension stabilizing agent is generally present in an amount of about 0.1 to 10, preferably about 7 to 9, parts by weight based on 100 parts of the dispersion medium by weight. If the water-soluble polymer suspension stabilizing agent is used in an amount of less than 0.1 parts by weight, it is difficult to provide the effect of the stabilizing agent.

The reducing agent can be any reagent effective to reduce PGMs to metallic (PGM(0)) form and is advantageously soluble in the dispersion medium (e.g., water-soluble). Although not limited thereto, in certain embodiments, the reducing agent may be an organic reducing agent. Suitable reducing agents are, for example, hydrogen, hydrazine, urea, formaldehyde, formic acid, ascorbic acid, citric acid, glucose, sucrose, xylitol, meso-erythritol, sorbitol, glycerol, maltitol or oxalic acid. Further, liquid reducing agents such as monovalent alcohols from the group of methanol, ethanol, 1-propanol, iso-propanol, 1-butanol, 2-butanol, 2-methyl-propan-1-ol, allyl alcohol and diacetone alcohol, may be employed. Certain preferred reducing agents are primary alcohols selected from the group consisting of methanol, ethanol, 1-propanol, iso-propanol and 1-butanol and mixtures and combinations thereof. Further suitable liquid reducing agents are divalent alcohols such as ethylene glycol, propylene glycol, diethylene glycol, tetraethylene glycol or dipropylene glycol. Other preferred reducing agents are hydrazine-based reducing agents such as formic hydrazide and hydroxyethylhydrazine and another one is natural plant-based polyphenol acids such as tannic acid and garlic acid. In one embodiment, the reducing agent is ascorbic acid. The reducing agent is usually present in an amount of about 1-10% by weight in the dispersion.

In certain embodiments, the colloidal PGMNP dispersions disclosed herein are substantially free from halides, alkali metals, alkaline earth metals, and sulfur compounds. For example, the dispersions may comprise less than about 10 ppm of each such component (i.e., less than about 10 ppm halides, alkali metals, alkaline earth metals, and/or sulfur compounds) based on the total weight of the colloidal dispersion. Particularly, it is desirable for the halide (e.g., chloride, bromide, and iodide) content to be less than about 10 ppm and for the sodium content to be less than about 10 ppm based on the total weight of the colloidal dispersion. Even lower concentrations of such components are even more desirable, e.g., less than about 5 ppm, less than about 2 ppm, or less than about 1 ppm based on the total weight of the colloidal dispersion. In preferred embodiments, no component(s) used in the production of the colloidal dispersions disclosed herein are halides, alkali metals, alkaline earth metals, and sulfur compounds (i.e., none of these components are intentionally added during preparation of the colloidal dispersions) and preferably no reagent(s) used in the production of the colloidal dispersions disclosed herein comprise significant amounts of such components (which may be present, if at all, as impurities in the reagents used, only in very small quantities, as referenced above, e.g., leading to a colloidal dispersion with less than about 10 ppm of that impurity based on the total weight of the colloidal dispersion).

The colloidal PGMNPs dispersions disclosed herein are preferably stable. By "stable" as used herein is meant that the colloidal dispersion remains well dispersed for some period of time. In certain embodiments, such dispersions can be considered to be shelf-stable for a period of about 3 months or more, about 6 months or more, about 9 months or more, or about 12 months or more. The shelf stability can be simulated, for example, by centrifuging a sample (e.g., in a Beckman Coulter Allegra™ X-22 Centrifuge) and observing the resulting dispersion to evaluate whether any precipitation is evident. For example, it is generally considered that, if a sample remains well-dispersed with no any precipitation after 4000 rpm for 10 min, the sample has a shelf life stability (e.g., at room temperature) of at least six months. This high stability allows, e.g., for the colloidal dispersion to be stored or transported away from the site of manufacture to a different site for application if necessary without any negative impact on the material.

In one embodiment, the present disclosure provides a colloidal dispersion comprising:

a) a plurality of nanoparticles (e.g., selected from the group consisting of Pt, Pd, alloys thereof, and mixtures thereof), wherein about 90% or more of the Pt and/or Pd is in fully reduced form, wherein the Pt and/or Pd concentration is from about 2 wt. % to about 5 wt. % of the colloidal dispersion, and wherein the nanoparticles have average particle sizes of from about 1 nm up to about 3 nm;

b) a stabilizing agent (e.g., polyvinylpyrrolidone); and c) a reducing agent (e.g., ascorbic acid);

wherein the colloidal dispersion is substantially free of halides, alkali metals, alkaline earth metals and sulfur compounds; and wherein, when centrifuged at 4,000 rpm for 10 minutes, the precious metal nanoparticles are not separated from the colloidal dispersion.

Although in some embodiments, the nanoparticles are provided in the form of a dispersion as disclosed above, in certain embodiments, the nanoparticle population can be further concentrated to form a more concentrated dispersion and, in some embodiments, to provide isolated metal nanoparticles. Various methods are known for concentrating dispersions and/or for obtaining solid metal nanoparticles (e.g., by removal of the solvent from the dispersion and/or by adding a second solvent to the dispersion).

Methods of Making Colloidal Dispersions

In another aspect of the disclosure is provided a method of making a PGMNP dispersion as described above (e.g., a PGMNP colloidal dispersion wherein about 90% or more of the PGM is in fully reduced form). Such methods generally comprise the steps of:

a) preparing a solution comprising: PGMNP precursors, wherein the PGMNP precursors are substantially free of halides, alkali metals, alkaline earth metals and sulfur compounds; at least one water soluble polymer suspension stabilizing agent; and a solvent; and b) combining the solution with at least one reducing agent so as to convert at least about 90% of the PGM to fully reduced metal.

Precious metal precursors useful for the purposes of this invention include salts of any of the precious group metals noted herein (i.e., salts of Pt, Pd, Au, Ag, Ru, Rh, Ir, Os and alloys thereof), which are substantially free of halides, alkali metals, alkaline earth metals and sulfur compounds. Such salts include, for example, alkanolamine salts, hydroxy salts, nitrates, carboxylic acid salts, ammonium salts, and oxides. Particular examples of precious metal precursors include monoethanolamine Pt(IV) hexahydroxide, dihydrogen hexahydroxyplatinate, $Pd(OH)_2$, $Ir(OH)_4$, Rh nitrate, Pt nitrate, Pt citrate, Pd(II) nitrate, Pd(II) citrate, and Pd (II) ammonia hydroxide complex.

The methods disclosed herein can be conducted under varying conditions. For example, in some embodiments, the method (including the preparing and/or combining steps noted above) can be conducted at room/ambient temperature (e.g., 15-25° C.). In some embodiments, one or more steps of the method can be conducted at elevated temperature. For example, the combining step may include a heating step such that the combined solution is heated at an elevated temperature, e.g., to promote the reduction of the PGM. In other embodiments, the colloidal dispersion comprising fully reduced nanoparticles is prepared and subsequently heated. In various embodiments, such elevated temperatures (to promote reduction and/or to heat post-reduction) can be greater than ambient temperature, such as ambient temperature to about 200° C., ambient temperature to about 125° C., or ambient temperature to about 100° C. (e.g., about 25° C. to about 100° C., 125° C., or 200° C.) In some embodiments, such temperatures can be about 55° C. to about 125° C., or about 55° C. to about 200° C. In certain embodiments, temperatures above 100° C. may be beneficial, e.g., at least about 100° C., e.g., about 100° C. to about 200° C. Certain suitable temperatures useful in various embodiments are about 90° C. to 130° C. (e.g., about 100° C., about 120° C., or about 125° C.).

The time for which the solution is reacted (and, optionally, heated) during the combining step can vary and can be any period of time sufficient to convert a substantial portion (e.g., at least about 90%) of the PGM to fully reduced metal (PGM (0)). For example, in some embodiments, the PGM is fully reduced over a period of at least about 30 minutes, at least about 1 hour, at least about 2 hours, at least about 6 hours, or at least about 12 hours. In certain embodiments, the solution is reacted over a period of about 30 minutes to about 24 hours, e.g., about 1 hour to about 18 hours. It is noted that reactivity of the reagents (including the precious metal precursor and the reducing agent) can affect the rate of reaction. It is also noted that time and temperature may be indirectly related for a given reaction, i.e., conducting the reaction at elevated temperature may lessen the amount of time required to obtain the desired reduction. Accordingly, it is to be understood that, for a given reaction, increasing the temperature may decrease the amount of time required for the disclosed methods and decreasing the temperature may increase the amount of time required for the disclosed methods.

In certain embodiments, the disclosed methods for the preparation of PGMNP dispersions can further comprise a hydrothermal processing step. For example, in certain embodiments, the reaction mixture (wherein the PGM can be in varying oxidation states, e.g., in precursor form, substantially in reduced form, or at any stage between) can be subjected to heating (including hydrothermal processing) in an autoclave. In one particular embodiment, such a mixture can be heated at an elevated temperature above ambient temperature, such as at least about 100° C., e.g., about 100° C. to about 200° C., including at about 125° C., for a particular period of time, such as at least about 1 hour, at least about 2 hours, at least about 3 hours, e.g., about 1 to about 10 hours, including for about 5 hours, in an autoclave.

In one particular embodiment, the disclosed method comprises:

a) preparing a solution (e.g., an aqueous solution) of PGM precursors substantially free of halides, alkali metals, alkaline earth metals and sulfur compounds wherein the PGM is selected from the group consisting of Pt, Pd, and alloys thereof and combinations thereof, in the presence of at least one water soluble polymer suspension stabilizing agent; and b) combining at least one reducing agent with the solution to convert at least about 90% of the PGM precursors to fully reduced metal form.

In another particular embodiment, the disclosed method comprises:

a) preparing a solution (e.g., an aqueous solution) of monoethanolamine Pt(IV) hexahydroxide in the presence of polyvinylpyrrolidone; and b) combining the solution with ascorbic acid (e.g., at reaction temperatures of from no less than about 55° C. up to no more than 90° C.) for a period of time sufficient to convert at least about 90% of the PGM to fully reduced metal.

In a further particular embodiment, the disclosed method is a method for preparing platinum nanoparticles, wherein at least 90% of the platinum is in fully reduced form and wherein the nanoparticles are about 5 nm in average diameter, which comprises:

a) preparing a solution (e.g., an aqueous solution) of platinum precursor substantially free of halides, alkali metals, alkaline earth metals and sulfur compounds in the presence of at least one water soluble polymer suspension stabilizing agent; and b) combining the solution with ethylene glycol as a reducing agent (e.g., at a reaction temperature of from no less than about 55° C. up to no more than 110° C.) for a period of time to convert at least about 90% of the platinum to fully reduced metal.

In another particular embodiment, the disclosed method is a method for making fully reduced platinum nanoparticles which comprises:

a) preparing a solution (e.g., an aqueous solution) of a platinum precursor substantially free of halides, alkali metals, alkaline earth metals and sulfur compounds in the presence of polyvinylpyrrolidone;

b) combining the solution with ethylene glycol (e.g., at reaction temperatures of from no less than about 55° C. up to no more than 110° C.) for a period of time to convert at least about 90% of the platinum to fully reduced metal; and c) heating the resulting mixture (e.g., at a temperature of from about 100° C. to about 200° C.).

The methods disclosed herein can, in some embodiments, be characterized as providing precious group metal nanoparticles in relatively high yield. For example, in various embodiments, the methods can lead to dispersions comprising precious group metal nanoparticles wherein 90% or more of the precious group metal is in fully reduced form and where the overall percent yield of nanoparticles is at least about 60%, at least about 70%, at least about 80%, at least about 90%, or at least about 98%. In some embodiments, the methods provide the desired product in quantitative or near quantitative yield.

As prepared, the colloidal dispersions can have varying concentrations of nanoparticles, e.g., about 1% to about 10% by weight, e.g., about 2% and about 6% by weight, about 2% to about 5% by weight, or about 4% to about 6% by weight, with no further processing (e.g., concentrating steps). The colloidal dispersions can be used as is or can be diluted with suitable solvents to lower PGM concentrations (e.g., to a concentration of about 0.05 wt. % to about 2 wt. %, such as about 0.05 wt. %, 0.5 wt. %, 1.5 wt. %, etc.). In other embodiments, the colloidal dispersions can be concentrated (e.g., by removing solvent therefrom). Methods for concentrating dispersions generally are known and, in some embodiments, concentrations significantly higher than those originally obtained (e.g., above about 2%, above about 3%, above about 4%, above about 5% or above about 6% by weight) can be obtained in this manner. For example, concentrating can provide a dispersion having a concentration of about 5% to about 80% by weight, e.g., about 5% to about 50% by weight. Accordingly, various ranges of concentrations can be achieved, e.g., about 0.05 wt. % to about 80 wt. %, including about 2 wt. % to about 80 wt. % and about 2 wt. % to about 10 wt. %.

In still further embodiments, the colloidal dispersions can be treated so as to obtain isolated PGNMPs therefrom. To obtain isolated nanoparticles, the methods disclosed herein can, in some embodiments, further comprises heating the dispersion or otherwise processing the dispersion to ensure removal of at least a substantial portion of the solvent therefrom.

The colloidal dispersions described herein may be used in a variety of applications for which PGMs are useful. In certain embodiments, the colloidal dispersions disclosed herein may be used as catalysts in a variety of catalytic reactions, e.g., for hydrogenation reactions and dehydrogenation reactions. In some embodiments, the colloidal dispersions disclosed herein can be used as improved materials for mobile exhaust emission catalysts (e.g., for the purification of an exhaust gas of a combustion engine). For such catalytic applications, the colloidal dispersions may be deposited on a solid catalyst support, such as supports selected from the group consisting of silica, alumina, silica/alumina, titania, zirconia, $CeO_2$, rare earth oxides, zeolites, carbon, clay materials and combinations thereof. The supported catalysts may be prepared, e.g., by impregnation of the support material with the PGNMP dispersion by methods such as impregnation by incipient wetness or slurrying the dispersion with the support. In some embodiments, use of the colloidal dispersions disclosed herein to coat a solid support can provide a greater concentration of PGM on the solid support than is typically achieved with conventional PGM materials (e.g., in some embodiments, an increase of at least about 10%, at least about 15%, at least about 20%, at least about 25%, or at least about 30%, such as an increase of about 10% to about 50%, e.g., an increase of about 20% to about 40% PGM concentration relative to that obtained using a comparable amount of conventional PGM dispersion). For example, such comparative measurements can be conducted after aging the PGM materials on the solid support (typical conditions=750° C./4 hours/steam in air) and using Diffuse Reflectance Infrared Fourier Transform Spectrometer (DRIFTS) to analyze the amount of PGM associated with the solid support.

Certain embodiments of the invention are envisioned where at least some percentages, temperatures, times, and ranges of other values are preceded by the modifier "about." "Comprising" is intended to provide support for "consisting of" and "consisting essentially of." Where ranges in the claims of this application do not find explicit support in the specification, it is intended that such claims provide their own disclosure as support for claims or teachings in a later amendment of this application. Numerical ranges of ingredients that are bounded by zero on the lower end (for example, 0-10 vol. % PVP) are intended to provide support for the concept "up to [the upper limit]," for example "up to 10 vol. % PVP," vice versa, as well as a positive recitation that the ingredient in question is present in an amount that does not exceed the upper limit. An example of the latter is "comprises PVP, provided the amount does not exceed 10 vol. %." A recitation such as "8-25 vol. % (PGM+stabilizing agent+reducing agent)" means that any or all of PGM, stabilizing agent, and/or reducing agent may be present in an amount of 8-25 vol. % of the composition.

EXAMPLES

Synthesis of Chloride- and Sodium-Free Colloidal PGM Nanoparticles with 2-5 wt. % PGM Content Each of the following dispersions was prepared as described below and analyzed by TEM. For analysis, TEM samples were prepared by first diluting the colloidal Pt with DI water to a light brown solution. A droplet of this solution was applied to a holey-carbon coated Cu grid and dried at 60° C. A JEOL 200 kV TEM equipped with a LaB6 filament was used to collect digital images with a 2K×2K CCD camera.

Example 1: Synthesis of Chloride- and Sodium-Free Colloidal Pt Nanoparticles Using Polyvinylpyrrolidone (PVP) as Stabilizer and Ascorbic Acid as Reducing Agent (PVP/Pt (w/w)=4/1 and Ascorbic Acid/Pt (Mole/Mole)=3/1)

Figure 1:
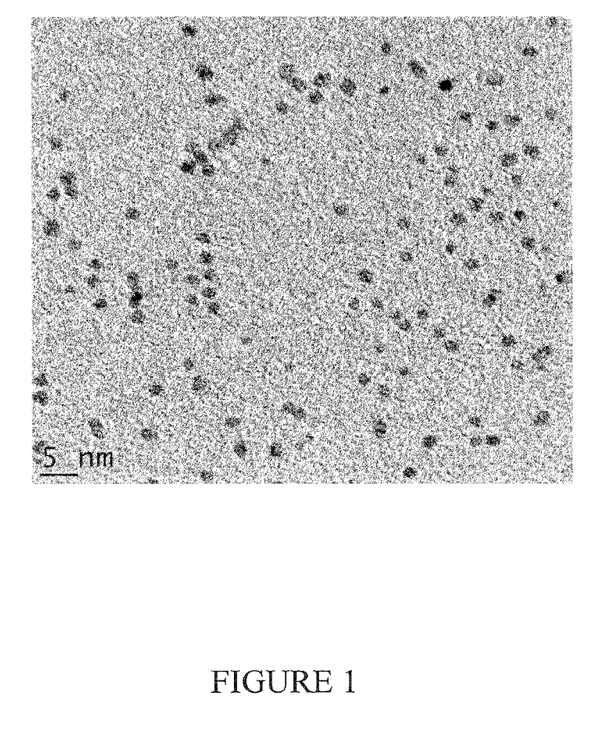
FIG. 1 is a transmission electron microscopy (TEM) image of Pt nanoparticles prepared using PVP as stabilizer and ascorbic acid as reducing agent.

In a method for synthesizing 100 g of 2% Pt colloidal solution, 40 g of PVP solution (0.02M) and 15.86 g of monoethanolamine Pt(IV) hexahydroxide (Pt-A) solution (12.61 wt. % Pt) and 13.39 g of $H_2O$ are mixed for about 30 min, then 30.75 g of ascorbic acid solution (1M) is added to the mixture with stirring and mixed for about 25 min. The resulting mixture is transferred into a Teflon-lined autoclave and heated without stirring in a gravity convection oven at 85° C. for 12 hr. After this time, the reactor is cooled down to room temperature and the product is removed from the reactor. The obtained Pt nanoparticles exhibited narrow Pt size distribution (1-2 nm) with a yield of 87% fully reduced Pt. The obtained colloidal nanoparticle dispersion is centrifuged at 4000 rpm for 10 min, after which time no precipitation is observed, indicating that this colloidal Pt nanoparticle dispersion is shelf-stable (can be stored) for more than 6 months without precipitation. See FIG. 1 for a TEM image of Pt nanoparticles prepared using PVP as stabilizer and ascorbic acid as reactant, as prepared in Example 1.

Example 2

Example 2 is the same as Example 1, except the reaction temperature is 50° C., whereby a stable colloidal dispersion with a narrow particle size distribution of 1-3 nm Pt nanoparticles is obtained.

Example 3

Example 3 is the same as Example 1, except the reaction temperature is 120° C., whereby a stable colloidal dispersion with a narrow particle size distribution of 1-4 nm Pt nanoparticles is obtained.

Example 4

Example 4 is the same as Example 1, except the ratio of PVP/Pt is 1/1, whereby a stable colloidal dispersion with a narrow particle size distribution of 1-5 nm Pt nanoparticles is obtained.

Example 5

Example 5 is the same as Example 1, except the ratio of PVP/Pt is 2/1, whereby a stable colloidal dispersion with a narrow particle size distribution of 1-5 nm Pt nanoparticles is obtained.

Example 6

Example 6 is the same as Example 1, except the ratio of PVP/Pt is 8/1, whereby a stable colloidal dispersion with a narrow particle size distribution of 1-4 nm Pt nanoparticles is obtained.

Example 7

Example 7 is the same as Example 1, except the ratio of PVP/Pt is 12/1, whereby a stable colloidal dispersion with a narrow particle size distribution of 1-4 nm Pt nanoparticles is obtained.

Example 8

A PVP solution (5 g of 0.02 M solution), 3.97 g of Pt-A solution (12.61 wt. % Pt) and 69.95 g of $H_2O$ are mixed for about 30 min, then 7.69 g of ascorbic acid solution (1M) is added to the mixture with stirring and mixed for about 25 min. The resulting mixture is transferred into a Teflon-lined autoclave and heated without stirring in a gravity convection oven at 85° C. for 12 hr. After this time, the reactor is cooled down to room temperature and then the product is removed from the reactor. A stable colloidal 0.5% Pt nanoparticle solution is obtained with a narrow particle size distribution of 1 to 3 nm.

Example 9

A PVP solution (40 g of 0.02 M solution), 31.72 g of Pt-A solution (12.61 wt. % Pt) and 12.90 g of $H_2O$ are mixed for about 30 min, then 15.38 g of ascorbic acid solution (1M) is added to the mixture with stirring and mixed for about 25 min. The resulting mixture is transferred into a Teflon-lined autoclave and heated without stirring in a gravity convection oven at 85° C. for 12 hr. After the reaction is finished, the reactor is cooled down to room temperature and then the product is removed from the reactor. A stable colloidal 4% Pt nanoparticle dispersion is obtained with narrow particle size distribution of 1 to 4 nm.

Example 10

A PVP solution (28 g of 0.04M solution), 44.41 g of Pt-A solution (12.61 wt. % Pt) and 6.06 g of $H_2O$ are mixed for about 30 min, then 21.53 g of ascorbic acid solution (1M) are added to the mixture with stirring and mixed for about 25 min. The resulting mixture is transferred into a Teflon-lined autoclave and heated without stirring in a gravity convection oven at 85° C. for 12 hr. After the reaction is finished, the reactor is cooled down to room temperature and then the product is removed from the reactor. A stable colloidal 5.6% Pt nanoparticle dispersion is obtained with a narrow particle size distribution of 1 to 4 nm.

Example 11: Synthesis of Chloride- and Sodium-Free Colloidal Pt Nanoparticles Using PVP as Stabilizer. (PVP/Pt (w/w)=4/1 and Glucose/Pt (Mole/Mole)=3/1)

Figure 2:
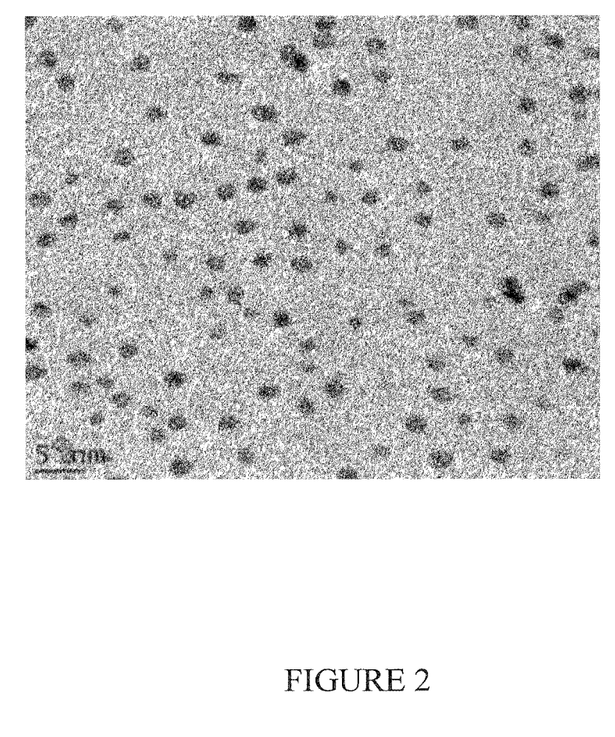
FIG. 2 is a TEM image of Pt nanoparticles prepared using PVP as stabilizer and glucose as reducing agent.

A PVP solution (40 g of 0.02 M PVP solution), 15.86 g of Pt-A solution (12.61 wt. % Pt) and 13.39 g of $H_2O$ are mixed for about 30 min, then 30.75 g of glucose solution is added to the above mixture with stirring and mixed for about 25 min. The resulting mixture is transferred into a Teflon-lined autoclave and heated without stirring in a gravity convection oven at 125° C. for 12 hr. After this time, the reactor is cooled down to room temperature and then the product is removed from the reactor. The stable colloidal Pt nanoparticles are obtained with narrow particle size distribution of 1 to 3 nm. See FIG. 2, providing a TEM image of Pt nanoparticles prepared using PVP as a stabilizer and glucose as a reducing agent prepared according to this Example 11.

Example 12: Synthesis of Chloride- and Sodium-Free Colloidal Pt Nanoparticles Using PVP as Stabilizer. (PVP/Pt (w/w)=4/1 and Tetraethylene Glycol/Pt (Mole/Mole)=3/1)

Figure 3:
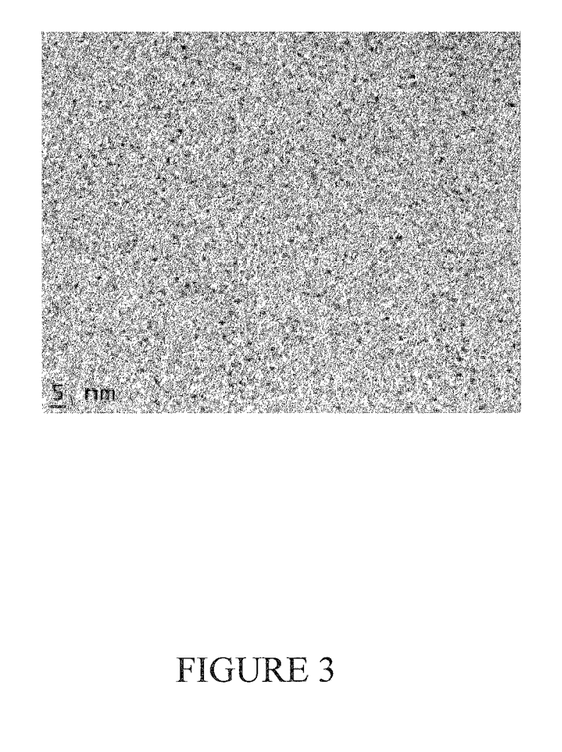
FIG. 3 is a TEM image of Pt nanoparticles prepared using PVP as stabilizer and tetraethylene glycol as reducing agent.

A PVP solution (40 g of 0.02M solution), 15.86 g of Pt-A solution (12.61 wt. % Pt) and 13.39 g of $H_2O$ are mixed for about 30 min, then 30.75 g of tetraethylene glycol solution is added to the above mixture with stirring and mixed for about 25 min. The resulting mixture is transferred into a Teflon-lined autoclave and heated without stirring in a gravity convection oven at 125° C. for 12 hr. After this time, the reactor is cooled down to room temperature and then the product is removed from the reactor. The stable colloidal Pt nanoparticles are obtained with narrow particle size distribution of 1 to 3 nm. See FIG. 3, providing a TEM image of Pt nanoparticles prepared using PVP as stabilizer and tetraethylene glycol as reducing agent, prepared according to this Example 12.

Example 13: Synthesis of Chloride- and Sodium-Free Colloidal Pt Nanoparticles Using PVP as Stabilizer. (PVP/Pt (w/w)=4/1 and Ethanol/Pt (Mole/Mole)=3/1)

Figure 4:
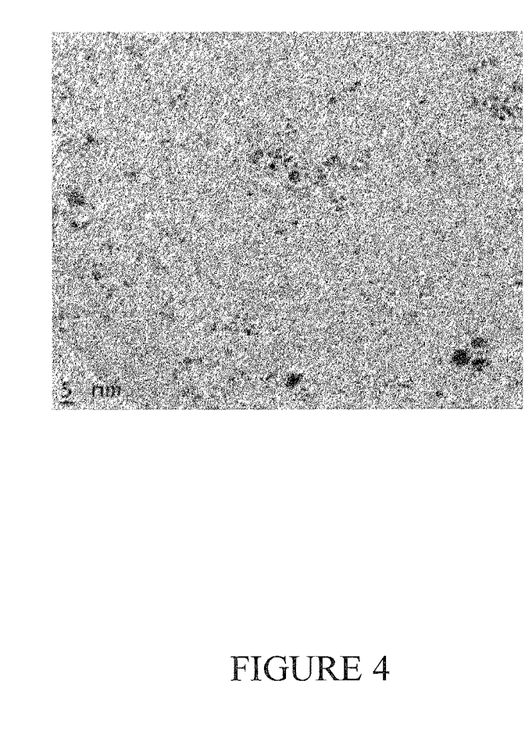
FIG. 4 is a TEM image of Pt nanoparticles prepared using PVP as stabilizer and ethanol as reducing agent.

PVP solution (40 g of 0.02M solution), 15.86 g of Pt-A solution (12.61 wt. % Pt) and 13.39 g of $H_2O$ are mixed for about 30 min, then 30.75 g of ethanol is added to the above mixture with stirring and mixed for about 25 min. The resulting mixture is transferred into a Teflon-lined autoclave and heated without stirring in a gravity convection oven at 120° C. for 12 hr. After the reaction is finished, the reactor is cooled down to room temperature and then the product is removed from the reactor. The stable colloidal Pt nanoparticles are obtained with a particle size distribution of 1 to 8 nm. See FIG. 4, which provides a TEM image of Pt nanoparticles prepared using PVP as a stabilizer and ethanol as a reducing agent, prepared according to this Example 13.

Example 14

Figure 5:
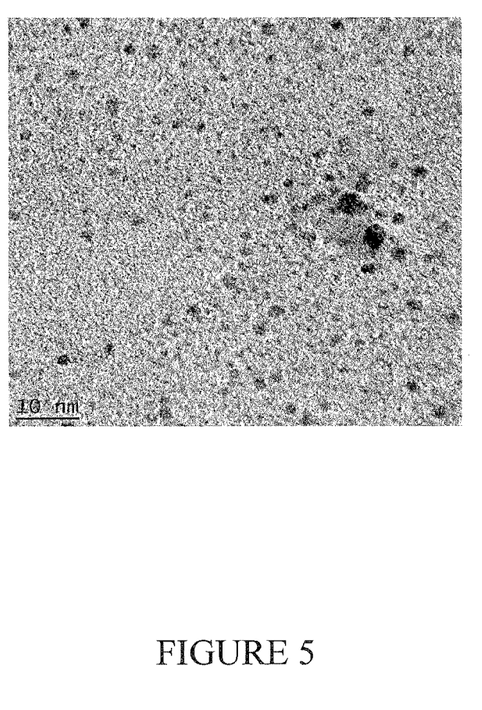
FIG. 5 is a TEM image of Pt nanoparticles prepared using Pt—N as precursor.

A PVP solution (40 g of 0.02M solution) and 10.49 g of Pt(II) nitrate (Pt—N) solution (19.06 wt. % Pt) and 13.39 g of $H_2O$ are mixed for about 30 min, then 30.75 g of ascorbic acid solution (1M) is added to the above mixture with stirring and mixed for about 25 min. The resulting mixture is transferred into a Teflon-lined autoclave and heated without stirring in a gravity convection oven at 90° C. for 12 hr. After the reaction is finished, the reactor is cooled down to room temperature and then the product is removed from the reactor. The particle size distribution of the obtained Pt nanoparticles is in the range of 1 to 5 nm. See FIG. 5, providing a TEM image of Pt nanoparticles prepared using Pt—N as a precursor, prepared according to this Example 14.

Example 15: Synthesis of Pt Nanoparticles in a Batch Reactor

Figure 6:
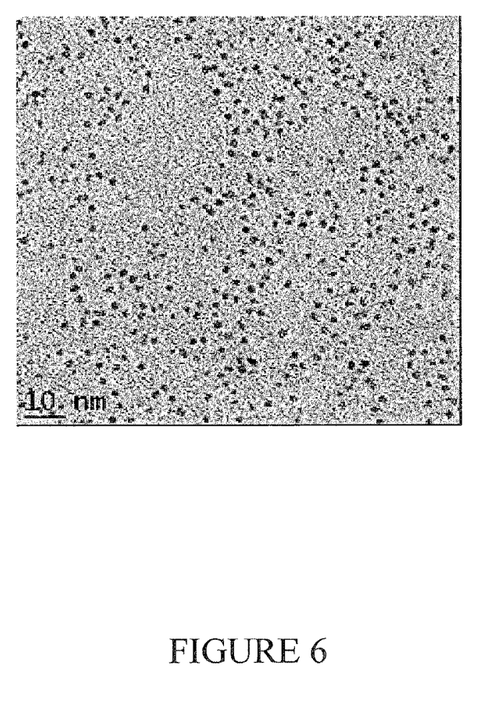
FIG. 6 is a TEM image of Pt nanoparticles prepared in a batch reactor.

To synthesize 100 g of 2% Pt colloidal solution, PVP solution (40 g of 0.02 M solution) and 15.86 g of monoethanolamine Pt(IV) hexahydroxide (Pt-A) solution (12.61 wt. % Pt) and 13.39 g of $H_2O$ are mixed in a reflux batch reactor for about 30 min, then 30.75 g of ascorbic acid solution (1M) is added to the above mixture with stirring and mixed for about 25 min. The mixture is heated without stirring at 85° C. for 12 hr. After this time, the reactor is cooled down to room temperature and then the product is removed from the reactor. The obtained Pt nanoparticles exhibited narrow Pt size distribution (1-3 nm) with a yield of 88%. The obtained colloidal nanoparticle dispersion is centrifuged at 4000 rpm for 10 min. and no precipitation is observed. See FIG. 6, providing a TEM image of Pt nanoparticles prepared in a batch reactor according to this Example 15.

Example 16: Synthesis with Stirring

To synthesize 100 g of 2% Pt colloidal dispersion, 40 g of PVP solution (0.02M) and 15.86 g of monoethanolamine Pt(IV) hexahydroxide (Pt-A) solution (12.61 wt. % Pt) and 13.39 g of $H_2O$ are mixed for about 30 min, then 30.75 g of ascorbic acid solution (1M) is added to the above mixture with stirring and mixed for about 25 min. The resulting mixture is transferred into a Teflon-lined autoclave. The autoclave is heated to 90° C. from room temperature at a ramping rate of ~0.5° C./min, and then maintained at 90° C. for 10 hrs. The stirring rate is set to 50 rpm. After this time, the reactor is cooled down to room temperature and any pressure in the chamber is released by opening the gas release valve. Then the product is removed from the autoclave. The particle size distribution of the obtained Pt nanoparticles is in the range of 1 to 3 nm.

Example 17

Figure 7:
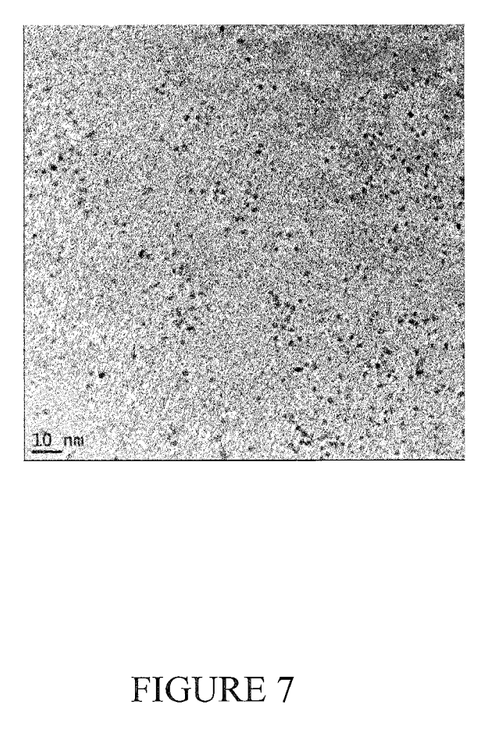
FIG. 7 is a TEM image of Pt nanoparticles prepared in Example 17.

A 15 kg batch of 2% Pt colloidal solution is produced using the same procedure and the same ratio of PVP/ascorbic acid/Pt as Example 16. The reactor temperature is controlled at 100° C. for 4 hours. The obtained Pt nanoparticles exhibited narrow Pt size distribution (1-3 nm) with a yield of 94%. The obtained colloidal nanoparticle dispersion is centrifuged at 4000 rpm for 10 min at ambient temperature and no precipitation is observed (simulating a shelf life of >6 months). See FIG. 7, providing a TEM image of Pt nanoparticles prepared in accordance with this Example 17.

Figure 8:
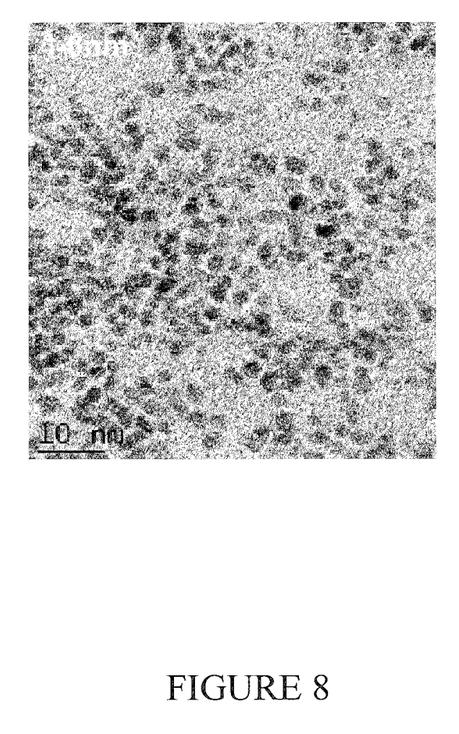
FIG. 8 is a TEM image of mono-dispersed Pt nanoparticles prepared using ethylene glycol as reducing agent.

Example 18: Synthesis of ~5 nm Monodisperse Pt Nanoparticles Using Ethylene Glycol as Reducing Agent In a method for synthesizing 100 g of 2% Pt colloidal Pt nanoparticle dispersion, 20.00 g of PVP solution (2M) and 12.03 g of Pt-A solution (12.61% Pt) and 42.97 g of $H_2O$ are mixed for about 30 min, then 25.00 g of ethylene glycol is added to the above mixture with stirring and mixed for about 25 min. The final mixture is subsequently transferred into a Teflon-lined static autoclave and heated in a gravity convection oven at 125° C. for about 5 hr. After that time, the autoclave is cooled down to room temperature and the product is removed from the autoclave. Approximately 5 nm monodisperse Pt nanoparticles are obtained. The yield of Pt nanoparticles can be as high as 99%. See FIG. 8, which provides a TEM image of monodisperse Pt nanoparticles prepared using ethylene glycol as reducing agent.

Example 19

Example 19 is the same as Example 18, except that Pt—N is used as a precursor, whereby a stable colloidal solution with a particle size distribution of 1-5 nm Pt nanoparticles is obtained.

Example 20

Example 20 is the same as Example 18, except using meso-erythritol as the reducing agent, whereby a stable colloidal dispersion with a narrow particle size distribution of 2-4 nm Pt nanoparticles is obtained.

Example 21

Example 21 is the same as Example 18, except using xylitol as the reducing agent, whereby a stable colloidal dispersion with 2-4 nm monodisperse Pt nanoparticles is obtained.

Example 22

Example 22 is the same as Example 18, except using sorbitol as the reducing agent, whereby a stable colloidal dispersion with 2-4 nm monodisperse Pt nanoparticles is obtained.

Example 23

Example 23 is the same as Example 18, except using glycerol as the reducing agent, whereby a stable colloidal dispersion with a narrow particle size distribution of 2-4 nm Pt nanoparticles is obtained.

Example 24

Example 24 is the same as Example 18, except using sucrose as the reducing agent, whereby a stable colloidal dispersion with 2-4 nm monodisperse Pt nanoparticles is obtained.

Example 25

Example 25 is the same as Example 18, except using maltitol as the reducing agent, whereby a stable colloidal dispersion with a narrow particle size distribution of 2-4 nm Pt nanoparticles is obtained.

Figure 9:
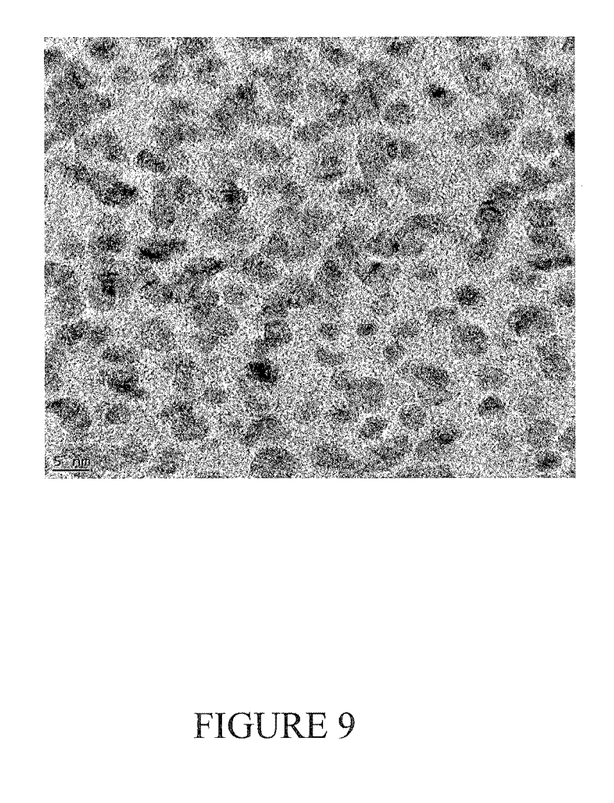
FIG. 9 is a TEM image of Pd nanoparticles prepared using PVP as stabilizer and ascorbic acid as the reducing agent.

Example 26: Synthesis of Chloride- and Sodium-Free Colloidal Pd Nanoparticles with 2% Pd Content In a method for synthesizing 100 g of 2% Pd colloidal solution with PVP/Pd (w/w)=4/1 and ascorbic acid/Pd (mole/mole)=1.55/1, 26.8 g of PVP solution (0.03 M) and 8.8 g of Pd nitrate solution (22.77 wt. % Pd) and 35.2 g of $H_2O$ are mixed for about 30 min at room temperature, then 29.2 g of ascorbic acid solution (1M) is added to the above mixture with stirring about 25 min. The final mixture is transferred into a reflux batch-reactor and heated with stirring at 55° C. for 2 hr. After this time, the reactor is cooled down to room temperature and then the product is removed from the reactor. The obtained Pd nanoparticles show a narrow Pd size distribution (3-6 nm) with high yield (>98%). This colloidal Pd solution can be stable for more than one month without precipitation. See FIG. 9, which provides a TEM image of Pd nanoparticles prepared using PVP as stabilizer and ascorbic acid as the reducing agent, in accordance with this Example 26.

Figure 10:
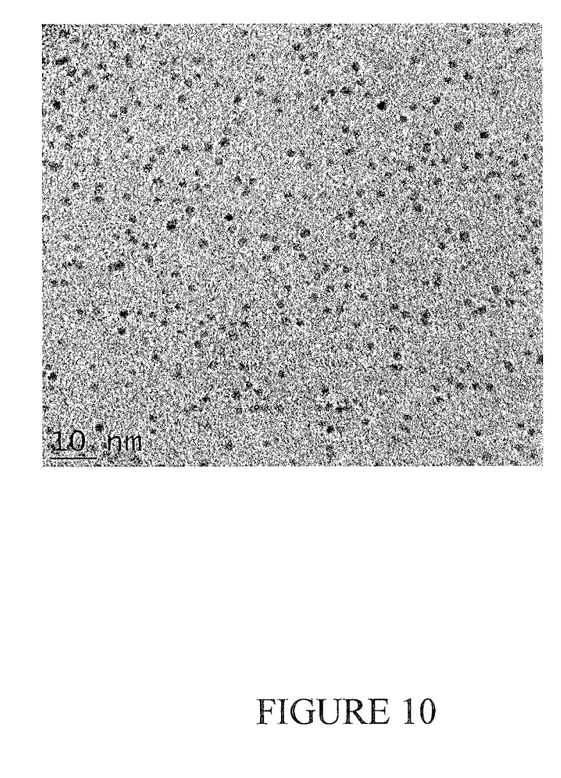
FIG. 10 is a TEM image of Rh nanoparticles prepared using PVP as stabilizer and glucose as reducing agent.

Example 27: Synthesis of Chloride- and Sodium-Free Colloidal Rh Nanoparticles with 1% Rh Content In a method for synthesizing 100 g of 1% Rh colloidal solution with PVP/Rh (w/w)=4/1 and glucose/Rh (mole/mole)=5/1, 100 g of PVP solution (0.01M) and 10.1 g of Rh nitrate solution (9.92 wt. % Rh) are mixed for about 30 min, then 50 g of glucose solution (18.7%) is added to the above mixture with stirring and mixed for about 25 min. The final mixture is transferred into a Teflon-lined autoclave and heated in a gravity convection oven at 120° C. for 5 hr. After this time, the autoclave is cooled down to room temperature and then the product is removed from the autoclave. The obtained Rh nanoparticles show a narrow size distribution (1-2 nm) with a yield of >50%. This colloidal Rh nanoparticle dispersion can be stable for more than six months without precipitation. See FIG. 10, providing a TEM image of Rh nanoparticles prepared using PVP as the stabilizer and glucose as the reducing agent.

Example 28

Figure 11:
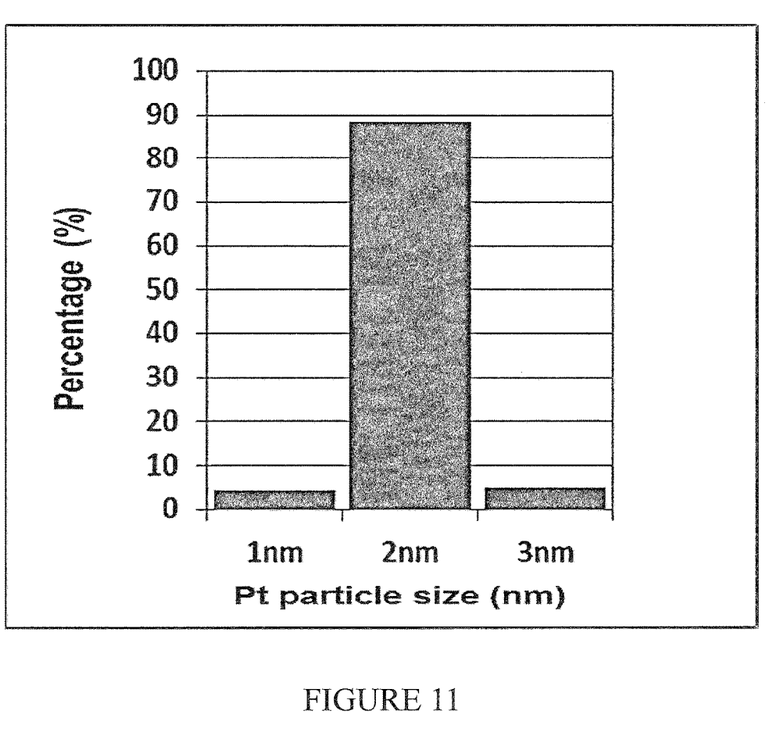
FIG. 11 is a graph showing particle size distribution of Pt nanoparticles prepared using PVP as stabilizer and ascorbic acid as reducing agent by TEM analysis.
Figure 12:
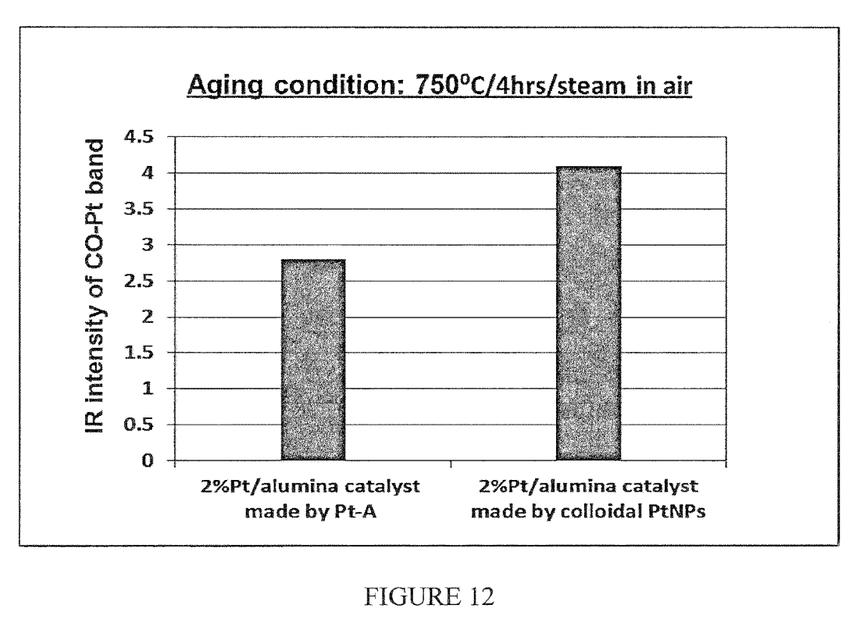
FIG. 12 is a graph providing a comparison of the Pt dispersions of the two alumina supported Pt catalyst samples which are made by using the colloidal Pt nanoparticles and by using conventional Pt precursor (Pt-A).

The material of Example 8 is applied to an alumina support and evaluated for its ability to effectively coat the support. The particle size distribution of the material of Example 8 is shown in FIG. 11. The use of precious group metals as catalysts generally requires a high amount of PGM on a support, with an aim to provide a maximum possible number of catalytically active sites. The testing data (see FIG. 12) shows that, compared to a conventional Pt precursor (Pt-A), the colloidal Pt nanoparticles disclosed herein (exemplified using the nanoparticles prepared according to Example 8) achieve a higher Pt dispersion on an alumina support, tested following exposure to severe aging conditions (i.e., 750° C./4 hrs/steam in air). The data indicates that the atomic Pt dispersion on alumina (after aging the 2% Pt/alumina catalyst made by colloidal PtNPs) is higher by 37% than that of the 2% Pt/alumina catalyst made with a conventional Pt precursor. The Pt dispersion measurement is conducted on a Diffuse Reflectance Infrared Fourier Transform Spectrometer (DRIFTS). In the DRIFTS measurement, the material to be tested is ground into a powder, and then installed in an IR sample cell. Prior to CO chemisorption, the samples are heated at 400° C. for 1 h under 7% $H_2$/Ar gas flow and then cooled down to 30° C. After purging with pure Ar for about 10 minutes, 1% CO/Ar gas was introduced. The DRIFT spectra of adsorbed CO are collected on a Digilab FTS-7000 FT-IR spectrometer equipped with a Spectra-Tec high-temperature and high pressure diffuse reflectance attachment and a MCD detector until equilibrium is reached.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed:
1. A colloidal dispersion comprising:
   a) a plurality of precious group metal nanoparticles selected from the group consisting of Pt, Pd, Au, Ag, Ru, Rh, 1r, Os, alloys thereof, and mixtures thereof, wherein about 90% or more of the precious group metal is in fully reduced form;
   b) a dispersion medium comprising a polar solvent;
   c) a water-soluble polymer suspension stabilizing agent; and
   d) a reducing agent,
      wherein the nanoparticle concentration is at least about 2 wt. % of the total weight of the colloidal dispersion,
      wherein the nanoparticles have an average particle size of 1 to 8 nm and at least 95% of the nanoparticles have a particle size within this range;
      and further wherein the colloidal dispersion contains less than about 10 ppm each of halides, alkali metals, alkaline earth metals and sulfur compounds.

2. The colloidal dispersion of claim 1, wherein the precious group metal nanoparticles are selected from the group consisting of Pt, Pd, alloys thereof, and combinations thereof.

3. The colloidal dispersion of claim 1, wherein the water-soluble polymer suspension stabilizing agent is selected from the group consisting of polyvinylpyrrolidone, a copolymer comprising vinylpyrrolidone, a fatty acid-substituted or unsubstituted polyoxyethylene, and combinations thereof.

4. The colloidal dispersion of claim 1, wherein the reducing agent is selected from the group consisting of hydrogen, hydrazine, hydroxyethylhydrazine, formic hydrazide, urea, formaldehyde, formic acid, ascorbic acid, citric acid, glucose, sucrose, xylitol, meso-erythritol, sorbitol, glycerol, maltitol, oxalic acid, methanol, ethanol, 1-propanol, isopropanol, 1-butanol, 2-butanol, 2-methyl-propan-1-ol, allyl alcohol, diacetone alcohol, ethylene glycol, propylene glycol, diethylene glycol, tetraethylene glycol, dipropylene glycol, tannic acid, garlic acid, and combinations thereof.

5. The colloidal dispersion of claim 1, wherein the polar solvent is selected from the group consisting of water, alcohols, dimethylformamide, and combinations thereof.

6. The colloidal dispersion of claim 1, wherein the nanoparticles have an average particle size of 1 to 5 nm and at least 95% of the nanoparticles have a particle size within this range.

7. The colloidal dispersion of claim 1, wherein at least 95% of the nanoparticles have a particle size of within 50 percent of the average particle size.

8. The colloidal dispersion of claim 1, wherein the nanoparticle concentration is about 2 wt. % to about 80 wt. % of the total weight of the colloidal dispersion.

9. The colloidal dispersion of claim 1, wherein the dispersion is shelf stable for at least about six months at ambient temperature.

10. The colloidal dispersion of claim 1, where the nanoparticles are not separated from the colloidal dispersion when the dispersion is centrifuged at 4,000 rpm for 10 minutes at ambient temperature.

11. The colloidal dispersion of claim 1, wherein the plurality of precious group metal nanoparticles are selected from the group consisting of Pt, Pd, Ag, Ru, Rh, Ir, Os, alloys thereof, and mixtures thereof.

12. The colloidal dispersion of claim 1, wherein the plurality of precious group metal nanoparticles are selected from the group consisting of Pt, Pd, Ru, Rh, Ir, Os, alloys thereof, and mixtures thereof.

13. The colloidal dispersion of claim 1, wherein the nanoparticles have an average particle size of 1 to 6 nm and at least 95% of the nanoparticles have a particle size within this range.

14. A method of making a precious group metal nanoparticle colloidal dispersion of claim 1, comprising:
   a) preparing a solution of precious group metal precursors selected from salts of Pt, Pd, Au, Ag, Ru, Rh, Ir, Os and alloys thereof in the presence of a dispersion medium and a water soluble polymer suspension stabilizing agent, wherein the precious group metal precursors contain less than about 10 ppm each of halides, alkali metals, alkaline earth metals and sulfur compounds; and
   b) combining the solution with a reducing agent to provide a precious group metal nanoparticle colloidal dispersion wherein the nanoparticle concentration is at least about 2 wt. % of the total weight of the colloidal dispersion and wherein at least about 90% of the precious group metal in the colloidal dispersion is in fully reduced form.

15. The method of claim 14, wherein the precious group metal precursors are salts of Pt, Pd, or alloys thereof.

16. The method of claim 14, wherein the precious group metal precursors are selected from the group consisting of alkanolamine salts, hydroxy salts, nitrates, carboxylic acid salts, ammonium salts, and oxides.

17. The method of claim 14, wherein the precious group metal precursors are selected from the group consisting of monoethanolamine Pt(IV) hexahydroxide, dihydrogen hexahydroxyplatinate, Pd(OH)2, Ir(OH)4, Rh nitrate, Pt nitrate, Pt citrate, Pd(II) nitrate, Pd(II) citrate, and Pd (II) ammonia hydroxide complex.

18. The method of claim 14, further comprising applying the nanoparticle dispersion to a solid support material.

19. The method of claim 18, wherein the solid support material is selected from the group consisting of silica, alumina, silica/alumina, titania, zirconia, CeO2, rare earth oxides, zeolites, clay materials, carbon, and combinations thereof.

20. The method of claim 14, for preparing a platinum nanoparticle dispersion,
   wherein step a) comprises: preparing a solution of platinum precursor in a dispersion medium, in the presence of a water soluble polymer suspension stabilizing agent, wherein the solution is substantially free of halides, alkali metals, alkaline earth metals and sulfur compounds; and
   step b) comprises combining the solution with ethylene glycol as a reducing agent to provide a platinum nanoparticle colloidal dispersion, wherein the platinum nanoparticle concentration is at least about 2 wt. % of the total weight of the colloidal dispersion and wherein at least about 90% of the platinum in the colloidal dispersion is in fully reduced form, and wherein the platinum nanoparticles have an average particle size of 1 to 6 nm, wherein at least 95% of the nanoparticles have a particle size within this range.

21. The method of claim 20, wherein the platinum nanoparticles have an average particle size of 5 nm.

22. A catalyst comprising:
a) a solid support material; and
b) precious metal group nanoparticles associated with the support material, wherein the nanoparticles are prepared according to the method of claim 14.

23. The catalyst of claim 22, wherein the solid support material is selected from the group consisting of silica, alumina, silica/alumina, titania, zirconia, CeO2, rare earth oxides, zeolites, clay materials, carbon, and combinations thereof.

* * * * *

UNITED STATES PATENT AND TRADEMARK OFFICE
CERTIFICATE OF CORRECTION

PATENT NO. : 10,493,433 B2
APPLICATION NO. : 15/511271
DATED : December 3, 2019
INVENTOR(S) : Xiaoming Xu and Xinsheng Liu Page 1 of 1

It is certified that error appears in the above-identified patent and that said Letters Patent is hereby corrected as shown below:

In the Claims

Column 19, Line 9, Claim 1 delete "1r" and insert --Ir--, therefor.

Signed and Sealed this
Fourth Day of February, 2020

Andrei Iancu
*Director of the United States Patent and Trademark Office*